March 25, 1941. A. C. LINBERG 2,235,937

TANK LINING AND METHOD

Filed Aug. 5, 1938

Inventor
ANDREW C. LINBERG
by Kenway & Witter
Attorneys

Patented Mar. 25, 1941

2,235,937

UNITED STATES PATENT OFFICE 2,235,937

TANK LINING AND METHOD

Andrew C. Linberg, Newton Center, Mass., assignor to National Gunite Contracting Co., Boston, Mass., a corporation of Massachusetts Application August 5, 1938, Serial No. 223,351

5 Claims. (Cl. 72—14)

This invention relates to a novel and improved tank lining and to the method of producing the same, the invention being particularly applicable to the lining of defective or leaky tanks.

Large tanks are usually of cylindrical shape and have the side walls thereof constructed of sheet metal sections riveted together at their overlapping edges. These tanks frequently become defective, leaky and weak in places, and more especially at the overlapping joints. One object of my invention is the provision of a novel method of repairing and lining such tanks in a manner rendering them leakproof and providing a strong and substantial liner therefor.

In employing my invention in connection with used or defective tanks, I first thoroughly clean the defective or leaky portions and preferably the entire inner face of the tank wall and then apply a coating of a suitable waterproof composition thereof, such coating being of substantial thickness and of a flexible or elastic nature. I may furthermore reinforce relatively thin or weak portions of the tank wall by applying reinforcing plates thereover, these portions being also coated with the waterproof composition. Following this treatment, I preferably attach steel reinforcement to the tank wall adjacent to its inner face and then form a lining of Portland cement composition over such face and enclosing the reinforcement. This lining may be applied by a pneumatic cement placement machine or otherwise and when dry it forms a rigid or substantial liner for the tank. The liner together with the waterproof coating renders the tank leakproof and affords substantial protection against further deterioration.

Figure 1:
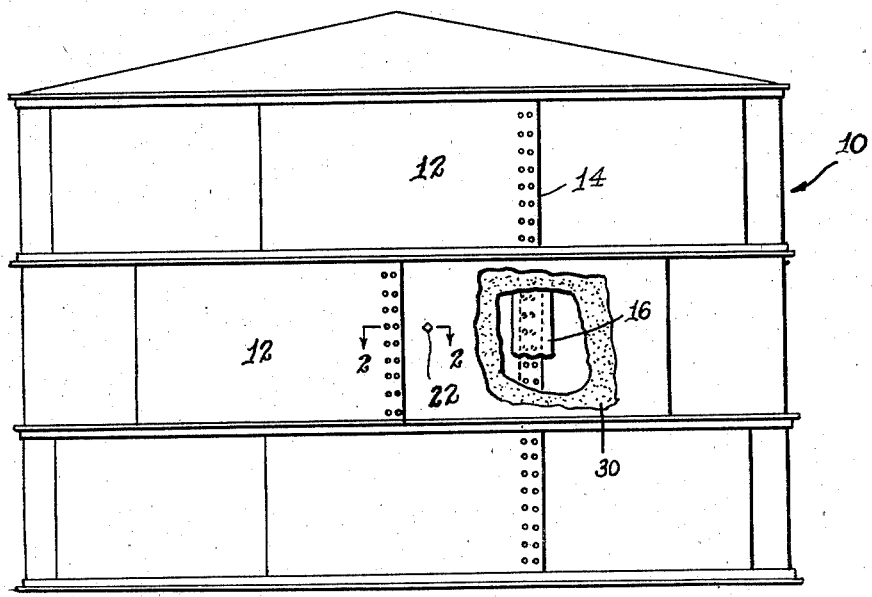
Figure 2:
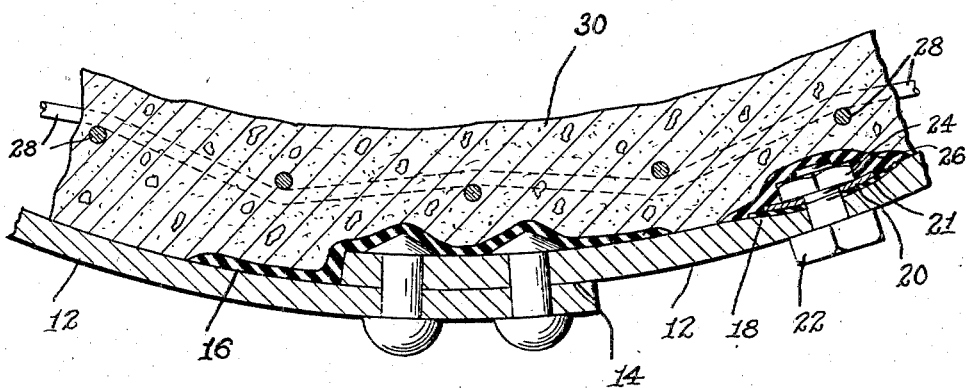

These and other features of the invention will be best understood and appreciated from the following description of a preferred embodiment thereof selected for purposes of illustration and shown in the accompanying drawing, in which, Fig. 1 is a side elevation of a tank having a portion broken away to illustrate the application of my invention thereto, Fig. 2 is an enlarged sectional view taken on line 2—2 of Fig. 1.

The side wall of the tank 10 is constructed in the usual manner of sheet metal sections 12 overlapped and riveted together at the joints 14. Such tanks frequently leak at these joints and/or become defective due to rust and exposure. While the novel liner comprising my invention may be used with new tanks or tanks which are not apparently defective, it is particularly adapted to use in repairing old or defective tanks. In repairing such a defective tank, I proceed as follows.

The seam or joint 14 which is defective is first thoroughly cleaned of rust scales and the like on the inner face of the wall. I then apply a coating 16 of suitable waterproof composition over and extending beyond the joint. The method used in applying this coating is of secondary importance but I prefer to use rubber latex or a rubber compound and I may apply the same by spraying or otherwise, the composition being of a homogeneous nature permitting such application thereof to the desired thickness. The spraying method lays on a relatively thin layer and the thickness of the coating may be increased as desired by repeated sprayings. The composition forms a bond with the tank wall and provides a resilient waterproof gasket over and the joint and rivets, the resiliency of the rubber composition causing the gasket completely to fill its occupied space and remain in close contact with both confining walls at all times.

It happens occasionally that a tank will be defective or weak in spots and in such case I may reinforce such spots before applying the tank lining thereto. Such a spot is illustrated at 18 and I have applied a reinforcing plate 20 together with a suitable gasket 21 thereto. A preferred method of securing the plate is to drill a hole through the center of the weak spot and pass a bolt 22 therethrough and through the plate. A nut 24 on the bolt serves to draw the plate and gasket tightly against the tank wall. This plate and the defective spot are then covered by a sealing layer 26 of the waterproof composition.

After the defective seams and spots have been treated and covered, and the entire inner wall preferably cleaned, I proceed to place a suitable lining over and in contact with the inner face of the tank wall including the covered seams and spots. This lining is of a Portland cement composition adapted to harden into a solid body and I preferably reinforce the same with steel reinforcement 28. I preferably proceed by attaching the steel reinforcement to the wall and spaced a suitable distance therefrom. The cement is then applied, preferably through the use of a pneumatic cement placement machine to the lining 30. This lining is in direct contact with and covers the wall and waterproof coatings and is bonded to the reinforcement 28. The lining may be of any suitable thickness which together with the reinforcement provides a rugged wall liner. The lining may furthermore be carried continuously over the bottom of the tank wall as well as over the side walls thereof to form one continuous lining for the entire tank.

Having thus described my invention what I claim as new and desire to secure by Letters Patent of the United States is:

1. A method of lining defective tanks which consists in attaching a reinforcing plate over the defective portion thereof at the inner face of the tank wall, covering the defective portion and plate with a sealing layer of homogeneous and waterproof composition, and forming a lining over the inner face of the tank wall and said sealing layer by covering the same with a layer of Portland cement composition adapted to harden into a solid body.

2. A method of lining defective tanks which consists in applying and bonding to the defective portions thereof at the inner face of the tank wall a sealing coat of resilient rubber composition from a homogeneous mass thereof, and forming a lining over the inner face of the tank wall and said sealing coat by covering the same with a layer of Portland cement composition.

3. The method defined in claim 2 in which the sealing coat of rubber composition is applied by first spraying a relatively thin layer thereof onto said face and thereafter increasing the thickness of the coat by repeated sprayings.

4. A method of lining tanks constructed of sections secured together along their edges which consists in applying and bonding to the inner face of the tank wall a sealing coat of resilient rubber composition from a homogeneous mass thereof, and forming a lining over the inner face of the tank wall and said sealing coat by covering the same with a layer of Portland cement composition adapted to harden into a solid body.

5. A method of lining defective tanks which consists in placing a gasket over the defective portion thereof at the inner face of the tank wall, bolting a reinforcing plate over the gasket, drawing the plate tightly toward the wall with the gasket gripped therebetween, covering the defective portion and plate with a sealing coat of waterproof composition, and forming a lining over the inner face of the tank wall and said sealing coat by covering the same with a layer of Portland cement composition adapted to harden into a solid body.

ANDREW C. LINBERG.